US008175851B1

(12) United States Patent
Francis et al.

(10) Patent No.: US 8,175,851 B1
(45) Date of Patent: May 8, 2012

(54) USING STATISTICAL LEARNING METHODS TO FUSE PARAMETER ESTIMATES

(75) Inventors: James Covosso Francis, Honeoye Falls, NY (US); David Delaney McGann, Penfield, NY (US)

(73) Assignee: L-3 Services, Inc., San Diego, CA (US)

( * ) Notice: Subject to any disclaimer, the term of this patent is extended or adjusted under 35 U.S.C. 154(b) by 224 days.

(21) Appl. No.: 12/566,480

(22) Filed: Sep. 24, 2009

(51) Int. Cl.
*G01B 21/22* (2006.01)
(52) U.S. Cl. ........................................ 702/199
(58) Field of Classification Search .................. 342/451;
702/189, 1, 127, 199; 708/100, 105, 131, 708/160, 200
See application file for complete search history.

(56) References Cited

U.S. PATENT DOCUMENTS

| | | | | |
|---|---|---|---|---|
| 6,269,376 | B1 * | 7/2001 | Dhillon et al. | 707/613 |
| 6,751,621 | B1 * | 6/2004 | Calistri-Yeh et al. | 1/1 |
| 6,799,170 | B2 * | 9/2004 | Lee et al. | 706/20 |
| 7,822,426 | B1 * | 10/2010 | Wuersch | 455/456.1 |
| 2007/0225912 | A1 * | 9/2007 | Grush | 701/213 |
| 2008/0113672 | A1 * | 5/2008 | Karr et al. | 455/456.1 |
| 2009/0005987 | A1 * | 1/2009 | Vengroff et al. | 701/300 |
| 2009/0022375 | A1 * | 1/2009 | Fidrich et al. | 382/128 |
| 2009/0324126 | A1 * | 12/2009 | Zitnick et al. | 382/275 |
| 2010/0088492 | A1 * | 4/2010 | Chakradhar et al. | 712/220 |
| 2010/0217763 | A1 * | 8/2010 | Park et al. | 707/737 |

OTHER PUBLICATIONS

D. Shutin, Clustering wireless channel impulse responses in angular-delay domain, IEEE 5th Workshop on Signal Processing Advances in Wireless Communications, p. 253-257, 2004.*
M. Wang et al., A RBFNN approach for DoA estimation of ultra wideband antenna array, Neurocomputing, vol. 71, p. 631-640, Jan. 2008.*
D. J. C. Mackay, Information Theory, Inference, and Learning Algorithms. Cambridge: Cambridge University Press, 2003, pp. 284-292.
T. Hastie, R. Tibshirani, and J. Friedman, The Elements of Statistical Learning. New York: Springer-Verlag, 2001, pp. 461-463.

* cited by examiner

*Primary Examiner* — Thomas Tarcza
*Assistant Examiner* — Fred H Mull
(74) *Attorney, Agent, or Firm* — Edward W. Callan (57) ABSTRACT

A preferred estimate of a given parameter is made by processing a set of data points representing estimates of the given parameter, such as the angle of arrival of a target signal. The process includes the steps of: (a) obtaining a set of data points representing estimates of a given parameter; (b) using a computer to process said data points with an unsupervised clustering algorithm to select data points for use in making a preferred estimate of the given parameter; and (c) using the selected data points to make a preferred estimate of the given parameter.

21 Claims, 7 Drawing Sheets

USING STATISTICAL LEARNING METHODS TO FUSE PARAMETER ESTIMATES

BACKGROUND OF THE INVENTION

The present invention generally pertains to estimating a given parameter, such as the angle of arrival (AOA) of a received target signal, and is particularly directed to making a preferred estimate of the given parameter from data points representing separate estimates of the given parameter.

A computer in a radio frequency (RF) signal direction finding system processes samples of a target signal received by an array of antenna elements to estimate the AOA for the received target signal. In order to estimate the AOA for target signal bursts that are received over short durations, the computer in the direction finding system must be able estimate the AOA by processing very-short-duration samples of the received target signal. If the target signal bursts are of a longer duration, then multiple AOA's are estimated by the computer during each burst of the received target signal. These multiple estimates of the AOA may vary due to (a) poor signal-to-nose ratio (SNR) of the received target signal, (b) antenna limitations, and/or (c) multiple target signals being received simultaneously within the tuned bandwidth of the direction finding system at different AOA's from different targets.

Poor SNR can result from increased background noise in the environment, the range to the target, the movement of the target's transmitting antenna, an obstacle moving in front of the target, or a signal from a wideband transmitter that causes the apparent background noise floor to increase. The SNR can also be affected by interference due to receipt of narrowband interfering received signals within the tuned bandwidth of the direction finding system. This interference can affect the sensitivity of the direction finding system and thereby affects the SNR of the target signal. This interference also adds an unknown component to the samples that are processed by the computer to estimate the AOA.

Antenna limitations, such as the spacing of the antenna elements relative to the wavelength ($\lambda$) of the frequency of the target signal, can cause a computer to estimate multiple possible AOAs. The computer of the direction finding system processes samples of the target signal obtained from different antenna elements to estimate the AOA of the target signal by determining the relative phase differences of the samples obtained from the different antenna elements and estimating the AOA in accordance with the relative phase difference that maximizes the energy for the different samples. The AOA of the target signal affects the relative phase of the antenna element at each of the individual antenna elements and thereby affects the relative energy for the received target signal samples obtained from the different antenna elements.

Consider the case of a 4-element circular array of antenna elements, wherein the elements are equally spaced $\pi/2$ apart around a circle of diameter D. When the wavelength $\lambda$ of the target signal becomes equal to or less than the diameter D of the circular array of antenna elements, it becomes difficult to estimate the AOA of target signal.

Now consider the scenario that occurs when the target signal is arriving at an angle that is along the axis of the antenna elements (i.e. 0-degrees, +/−90-degrees, and +/−180-degrees) and the wavelength $\lambda$ is equal to the diameter D. Assuming that an incoming signal arriving at 0-degrees hits the antenna as a straight wave front, the difference in the phase-dependent energy of the samples of the target signal received by opposing antenna elements is zero, since the elements disposed at 0-degrees and 180-degrees in relation to the AOA are sampling the incoming wave exactly $\lambda$ apart and the two elements at 90-degrees and −90-degrees in relation to the AOA are sampling at $\lambda/2$. In this situation, the computer of the direction finding system determines that there are multiple local maxima. The multiple local maxima present an ambiguity that is due to antenna limitations.

To minimize computation time, the AOA-estimation routine performed by the computer includes a two-stage peak search that could be affected by these local maxima, especially in low SNR conditions. The two-stage peak search is accomplished by first performing a coarse angle search over the whole range of $-\pi$ to $\pi$ and selecting the maximum value. Next, a range of angles is selected around the angle corresponding to the selected maximum value and a search is performed to find the angle corresponding to the peak of the maxima. Adding in the effects of noise, in situation discussed above in which the computer determines that there are multiple local maxima, the computer could ultimately estimate that there are multiple different AOAs.

In some communication environments, it is common to receive target signal from two or more targets within the same frequency bandwidth. For a direction finding system that is tuned to monitor this bandwidth, different AOAs will be estimated for target signals received from the different targets. It becomes important for the system to be able to differentiate the targets and their corresponding AOAs to simplify further processing or interpretation of the received target signals.

In scenarios where the wavelength $\lambda$ is approaching the diameter D of the circular antenna array or the angle or arrival is not along the axis of the antenna, a data fusion algorithm can be used to reduce or eliminate the antenna-limitation effects.

There are various approaches to fusing AOA estimates, such as averaging. Simple averaging of the AOA estimates reduces the number of data points and lessens the effect of the erroneous results, but still allows these estimates to affect the final AOA estimate, since each AOA estimate affects the final estimate equally.

However, merely averaging the AOA estimates does not differentiate between target signals arriving from multiple targets. In the worst case, averaging the AOA estimates for target signals simultaneously received from multiple targets produces an incorrect AOA estimate for any target.

SUMMARY OF THE INVENTION

The present invention uses a statistical learning technique, known as clustering, to make a preferred estimate of a given parameter, such as the AOA of a received target signal, by fusing separate estimates of the given parameter.

Clustering is a method of unsupervised learning, which is when an algorithm attempts to learn how a set of data is organized without any prior knowledge of how the data is organized. In accordance with a clustering method, one takes a set of data points and partitions the data points into different subsets (clusters). The goals are such that the data points in each particular cluster must seem like they belong to the particular cluster and that a single cluster is not fragmented into multiple clusters.

The present invention provides a method of making a preferred estimate of a given parameter by processing a set of data points representing estimates of the given parameter, comprising the steps of:

(a) obtaining a set of data points representing estimates of a given parameter;

(b) using a computer to process said data points with an unsupervised clustering algorithm to select data points for use in making a preferred estimate of the given parameter; and (c) using the selected data points to make a preferred estimate of the given parameter.

The method of the present invention reduces the number of data points that are ultimately used for making the preferred estimate of the given parameter and also reduces the effects of poor SNR conditions, transient interference, antenna limitation ambiguities and simultaneous receipt of target signals from multiple targets upon the accuracy of the preferred estimate.

Step (b) may comprise the steps of (d) organizing the set of data points representing estimates of the given parameter into different clusters of said data points by assigning the respective data points to their closest cluster;

(e) after all of the data points have been assigned, averaging all of the data points in each cluster to calculate a new data point at the center of each cluster;

(f) when at least some of the most recently calculated data points do not converge into a preferred cluster having predetermined characteristics, repeating steps (d) and (e) with the most recently calculated data points until at least some of the most recently calculated data points converge into a preferred cluster having the predetermined characteristics; and (g) when at least some, but not all, of the most recently, calculated data points converge into a preferred cluster having the predetermined characteristics selecting the data points of the preferred cluster for use in making the preferred estimate of the given parameter.

The present invention additionally provides a system for performing the above-described method and computer readable storage media including computer executable program instructions for causing one or more computers to perform and/or enable the steps of the respective above-described method.

Additional features of the present invention are described with reference to the detailed description.

DETAILED DESCRIPTION

Figure 1:
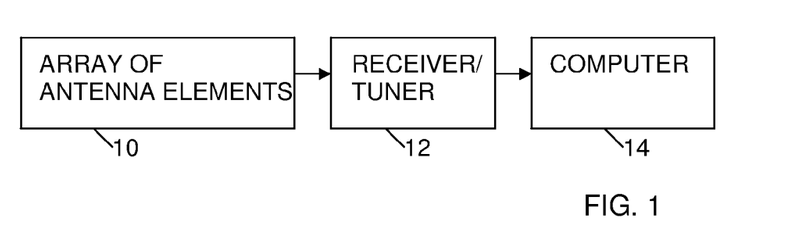
FIG. 1 is a block diagram a direction finding system including a computer that is adapted for performing the method of the present invention.

Referring to FIG. 1, an exemplary embodiment of a direction finding system in which the methods of the present invention is performed includes an array of antenna elements 10, a receiver/tuner 12 and a computer 14. In some embodiments there are separate arrays of antenna elements for low-band, mid-band, and high-band reception respectively.

The computer 14 contains computer readable storage media that includes computer executable program instructions for causing the computer to perform and/or enable the various processing steps that are described herein. These instructions are stored in the computer readable storage media of the computer when the computer is manufactured and/or upon being downloaded via the Internet or from a portable computer readable storage media containing such instructions. The computer 14 may be embodied in a combination of physically discrete computers, with the functions of the computer 14 described herein being performed by the combination of discrete computers.

A target signal received by the array of antenna elements 10 is sampled by the receiver/tuner 12; and the samples of the target signal are processed by the computer 14 to obtain a set of data points representing estimates of the received target signal. The computer 14 is adapted for making a preferred estimate of a given parameter by processing a set of data points representing estimates of the given parameter, such as the AOA of the received target signal.

Figure 2:
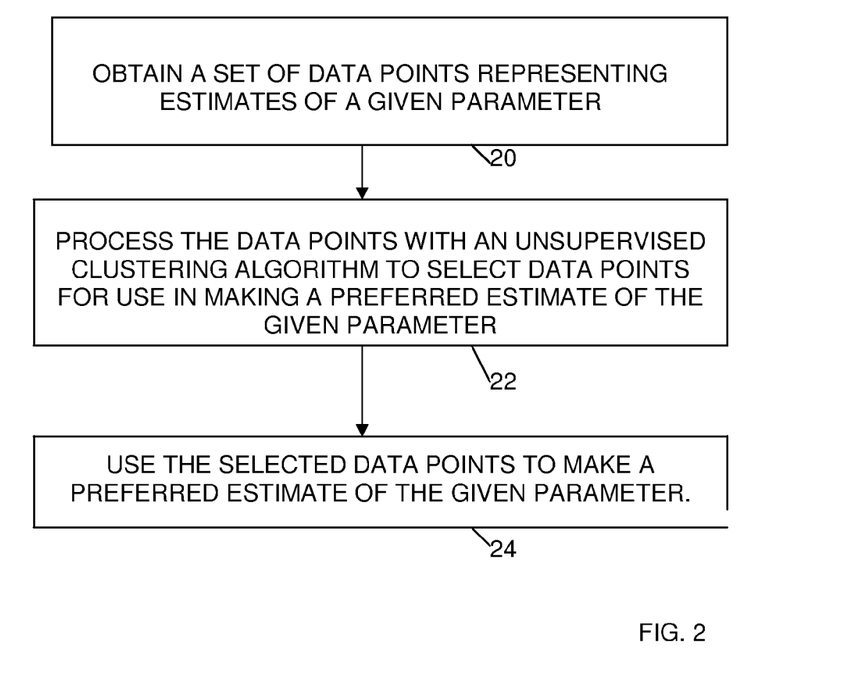
FIG. 2 is a flow diagram of the broad concept of the method of the present invention.

Referring to FIG. 2, the computer 14 is adapted for performing a routine 20 of obtaining a set of data points representing estimates of a given parameter, a routine 22 of processing the data points with an unsupervised clustering algorithm to select data points for use in making a preferred estimate of the given parameter and a routine 24 of using the selected data points to make a preferred estimate of the given parameter. In the embodiment in which the given parameter is the AOA of a received target signal, the set of data points in obtained by processing the samples of the target signal in order to obtain a set of data points representing estimates of the received target signal, as described above.

Preferably, the routine 24 of making a preferred estimate of the given parameter includes a subroutine of determining a weighted average of the selected data points in the preferred cluster, with individual data point being weighted by a likelihood ratio of the probability of the estimate represented by the individual data point in relation to another possible estimate. This weighting technique helps mitigate the effects of erroneous estimates of an AOA caused by poor SNR, since their likelihood ratios will be small, and AOA estimates not affected by poor SNRs will have larger likelihood ratios.

When the given parameter is the angle of arrival (AOA) of a target signal received by an array of antenna elements and the set of data points is derived from samples of the received signal, the likelihood ratio is either:

(i) $E_{global}/(E_{total}-E_{global})$ when no local maximum exists after removing the effects of an antenna response that is dependent on the AOA of the received signal, wherein $E_{total}$ is the total energy of the samples of the target signal from which the set of data points is derived, and $E_{global}$ is the energy of the global maximum of the received signal after removing the effects of an antenna response that is dependent on the AOA; or (ii) $(E_{total}-E_{local})/(E_{total}-E_{global})$, wherein when a local maximum exists after removing the effects of an antenna response that is dependent on the AOA of the received signal, wherein $E_{local}$ is the energy of the local maximum signal after removing the effects of an antenna response that is dependent on the AOA.

The preferred clustering algorithm chosen for performing the processing routine 22 is the k-means clustering algorithm. The k-means clustering algorithm is described by D. J. C. MacKay, "Information Theory, Inference, and Learning Algorithms", Cambridge University Press, Cambridge, 2003, at pp 285-288 and by T. Hastie, R. Tibshirani, and J. Friedman, "The Elements of Statistical Learning", Springer-Verlag, New York, 2001, at pp 461-463.

The k-means clustering algorithm is an iterative algorithm that assigns data points to the closest cluster. After all the data points have been assigned, all the points for a given cluster are averaged together to calculate a new cluster center. These steps are repeated for a limited number of cycles or until the cluster centers converge.

Figure 3:
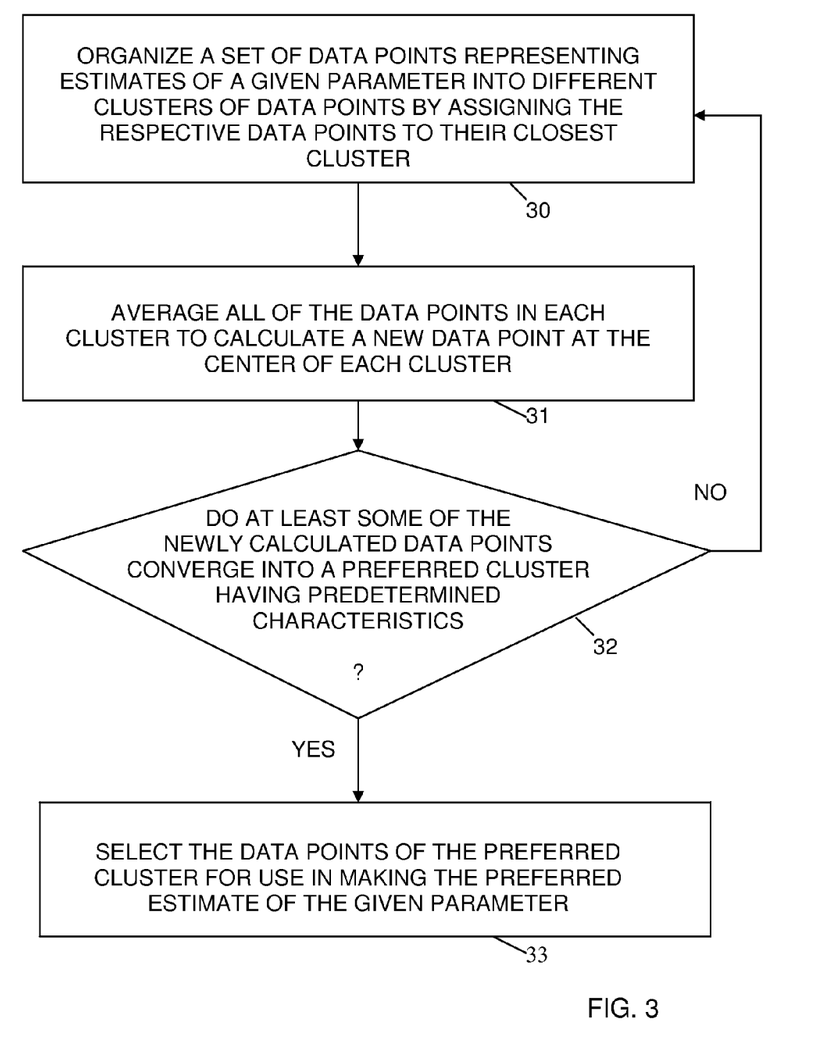
FIG. 3 is a flow diagram of an embodiment of the processing routine shown in FIG. 2.

Referring to FIG. 3, in one embodiment, the processing routine 22 shown in FIG. 2 includes the subroutine 30 of organizing the set of data points representing estimates of the given parameter into different clusters of the data points by assigning the respective data points to their closest cluster and the subroutine 31, wherein after all of the data points have been assigned, all of the data points in each cluster are averaged to calculate a new data point at the center of each cluster. A subroutine 32 is then performed to determine whether or not at least some of the most recently calculated data points converge into a preferred cluster having predetermined characteristics. In at least some embodiments, the preferred cluster is the cluster that has the predetermined characteristic of having the largest number of data points that are less than a threshold dimension from the center of the cluster.

In an embodiment in which the given parameter is the AOA of a received target signal, the preferred cluster is the cluster having the largest number of data points that are less than a threshold dimension, such as $\pi/12$, from the center of the cluster. Two clusters that are less than $\pi/12$ apart, are assumed to be a single cluster that the estimation algorithm is attempting to split apart, and therefore reports that there are k−1 clusters. The minimum angle threshold of $\pi/12$ is based upon the difference in angle between the correct angle and the angle seen due to the antenna-limitation ambiguities.

When at least some of the most recently calculated data points do not converge into a preferred cluster having the predetermined characteristics, the subroutines 30 and 31 are repeated with the most recently calculated data points until at least some of the most recently calculated data points converge into a preferred cluster having the predetermined characteristics.

When at least some of the most recently calculated data points converge into a preferred cluster having the predetermined characteristics, the computer performs the routine 33 of selecting the data points of the preferred cluster for use in making the preferred estimate of the given parameter.

Figure 4:
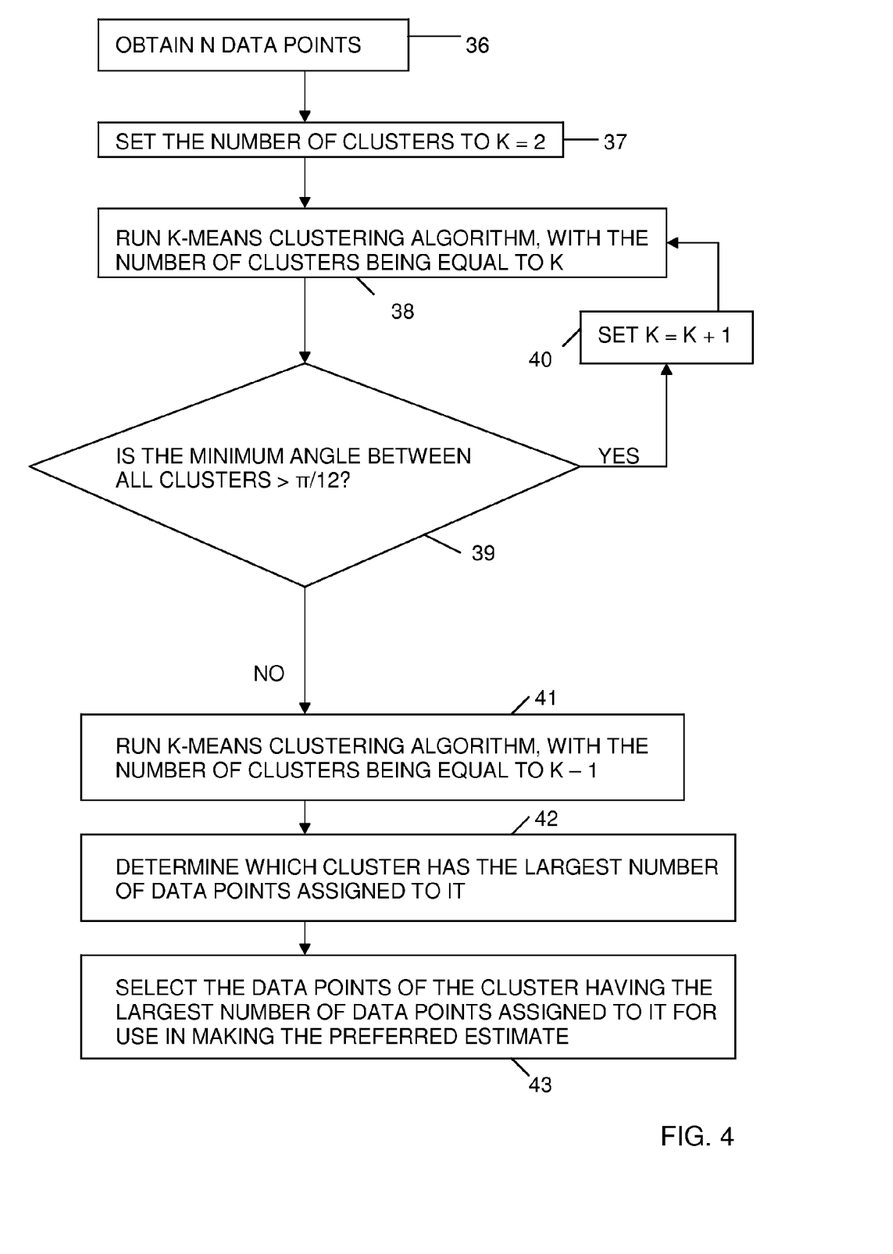
FIG. 4 is a flow diagram of an embodiment of the processing routine shown in FIG. 2 when the given parameter is the angle of arrival (AOA) of a target signal.

Referring to FIG. 4, when the given parameter is the angle of arrival (AOA) of a received target signal, the processing routine 22 shown in FIG. 2 includes the subroutine 36 of obtaining N data points, the subroutine 37 of setting the number of clusters to k=2, the subroutine 38 of running the k-means clustering algorithm with the number of clusters equal to k, and the subroutine 39 of determining whether or not the minimum angle between all clusters is greater than $\pi/12$.

If the minimum angle between all of the clusters is greater than $\pi/12$, k is then reset to k=k+1 pursuant to subroutine 40, and subroutines 38 and 39 are repeated.

If the minimum angle between all clusters is not greater than $\pi/12$, a subroutine 41 is performed, wherein the k-means clustering algorithm is run with the number of clusters equal to k−1. Subsequently in subroutine 42, it is determined that the cluster with most data points is the preferred cluster; and in subroutine 43, the data points of the preferred cluster are selected for use in making the preferred estimate of the AOA (the given parameter).

A difficulty with clustering is in determining the number of clusters and in selecting the initial center data points of the k different clusters. For the four embodiments of the above-described clustering algorithm subroutine 38 that are described below with reference to FIGS. 5-8, the angles of arrival ($\phi$) are converted to a complex form by taking $e^{j\phi}$, to thereby map the angle of arrival onto a unit circle. These four embodiments respectively utilize four different techniques of selecting k initial center data points of k different clusters.

Figure 5:
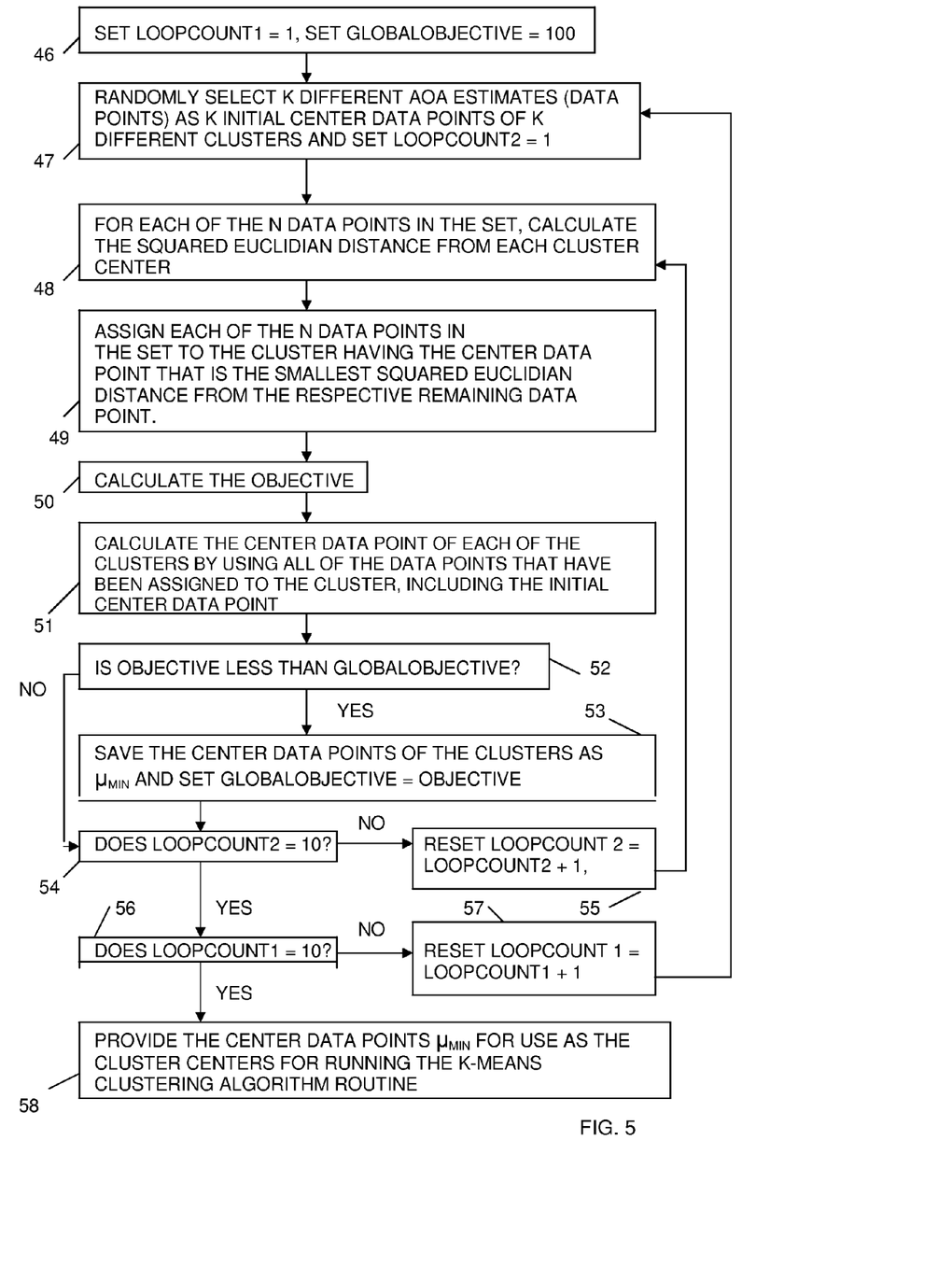
FIG. 5 is a flow diagram of one embodiment of the k-means clustering algorithm subroutine shown in FIG. 4.

Referring to FIG. 5, when the given parameter is the angle of arrival (AOA) of a received target signal, the clustering algorithm subroutine 38 described above with reference to FIG. 4 includes a subroutine 46 in which loopCount1 is set to equal 1 and GlobalObjective is set to equal a selected number, such as 100. Next in subroutine 47, k different AOA estimates (data points) are randomly selected as k initial center data points $\mu_1, \ldots \mu_k$ of k different clusters and loopCount2 is set to equal 1.

GlobalObjective is used for determining the best set of cluster locations for k clusters and a given set of data points. For each trial, the sum of the minimum squared Euclidian distances from each data point to all cluster centers is compared to the current value of GlobalObjective. If the sum is lower than GlobalObjective, GlobalObjective is then set to the new sum and a new set of cluster center data points is stored as the best set of cluster centers for the given data points. These functions are accomplished by subroutines 48 through 53, which are described below.

LoopCount1 is used for counting the number of times the k-means algorithm is executed with the initially selected clusters in order to find clusters that minimize GlobalObjective. For a particular embodiment this number is limited by subroutine 56. In the embodiment shown in FIG. 5, this number is limited to ten. For other embodiments, the number of times the k-means algorithm is executed with the initially selected clusters may be limited by subroutine 56 to some other number.

LoopCount2 is used for counting the number of times the k-means algorithm is executed with the new set of cluster center data points in order to find clusters that minimize GlobalObjective. For a particular embodiment this number is limited by subroutine 54. In the embodiment shown in FIG. 5, this number is limited to ten. For other embodiments, the number of times the k-means algorithm is executed with the new set of cluster centers may be limited by subroutine 54 to some other number.

During subroutine 48, for each of the N data points in the set, the squared Euclidian distance from each cluster center is calculated in accordance with:

$$d(\phi_i, \mu) = (e^{j\phi i} - e^{j\mu k})^2 \quad \text{[Eq. 1]}$$

During subroutine 49 each of the N data points in the set is assigned to the cluster having the center data point that is the smallest squared Euclidian distance from the respective remaining data point.

During subroutine 50, the objective is calculated in accordance with:

$$\text{objective} = \sum_{i=i}^{N} \min d(\varphi_i, \mu)^2 \quad \text{[Eq. 2]}$$

During subroutine 51 the center data point $\mu$ of each of the clusters is calculated by using all of the data points that have been assigned to the cluster, including the initial center data point. This calculation is in accordance with $$\mu = \frac{\sum_{i=1}^{n} e^{j\varphi_i}}{n} \qquad [\text{Eq. 3}]$$

During subroutine 52 a determination is made as to whether or not the objective calculated in subroutine 50 is less than the GlobalObjective.

If the objective is less than the GlobalObjective, subroutine 53 is performed to save the center data points of the clusters (as calculated in routine 51) as $\mu_{min}$ and to set the GlobalObjective to be equal to the objective calculated in subroutine 50.

If the objective is not less than the GlobalObjective, subroutine 53 is bypassed.

During subroutine 54, which follows either subroutine 52 or subroutine 53 in accordance with determination made during subroutine 52, a determination is made as to whether or not loopCount2 equals 10.

If loopCount2 does not equal 10, loopCount 2 is reset to equal loopCount2+1 pursuant to subroutine 55 and subroutines 48 through 54 are repeated until loopCount2 equals 10.

If loopCount2 does equal 10, a subroutine 56 is performed to determine whether or not loopCount1 is equal to 10.

If loopCount1 does not equal 10, loopCount 1 is reset to equal loopCount1+1 pursuant to subroutine 57 and subroutines 47 through 56 are repeated until loopCount1 equals 10.

If loopCount1 does equal 10, a subroutine 58 provides the center data points of the clusters saved during subroutine 53 as $\mu_{min}$ for use as the cluster centers for use when repeating subroutines 47-57.

The initial cluster center data point selection subroutine 47 works well except in a situation when there are a small percentage of data points that are extreme outliers and only data points in the main cluster are randomly selected as the k initial center data points. Since the majority of the data points usually lie within the main cluster, the outliers are not numerous enough to move the clusters more that $\pi/12$ apart. This prevents the outliers from forming their own cluster, whereby the outliers are ignored. In a worst case scenario, the likelihood ratios for the outliers are large enough to affect the cluster's weighted average and thereby distort the determination of the preferred estimate.

Figure 6:
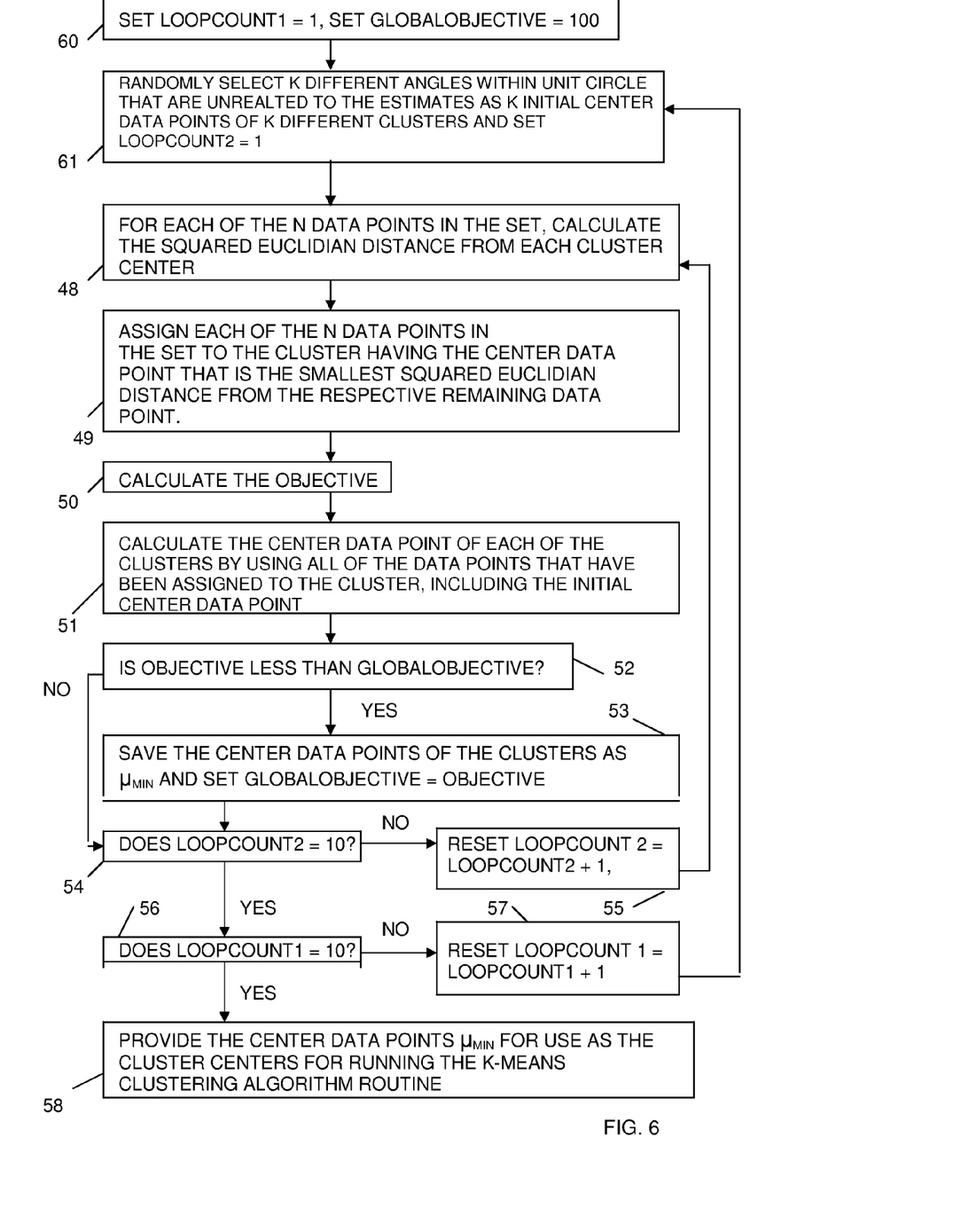
FIG. 6 is a flow diagram of a further embodiment of the k-means clustering algorithm subroutine shown in FIG. 4.

Referring to FIG. 6, when the given parameter is the angle of arrival (AOA) of a received target signal, the clustering algorithm subroutine 38 described above with reference to FIG. 4 includes a subroutine 60 in which loopCount1 is set to equal 1 and GlobalObjective is set to equal 100 or some other selected number. Next in subroutine 61, k different angles within the unit circle that are unrelated to the estimates are randomly selected as k initial center data points $\mu_1, \ldots \mu_k$ of k different clusters and loopCount2 is set to equal 1.

The remaining subroutines in the embodiment of FIG. 6 are the same as subroutines 48 through 58 described above with reference to FIG. 5, except that when it is determined pursuant to subroutine 56 that loopCount1 does not equal 10, after loopCount1 has been reset to equal loopCount1+1 pursuant to subroutine 57, subroutines 61 and 48 through 56 are repeated until loopCount1 equals 10; and when it is determined pursuant to subroutine 56 that loopCount1 does equal 10, the subroutine 58 provides the center data points of the clusters saved during subroutine 53 as $\mu_{min}$ for use as the cluster centers for use when repeating subroutines 61 and 48 through 57.

The initial cluster center data point selection subroutine 60 can prematurely cause the splitting of a single cluster or an early termination to the running of the cluster estimation algorithm. The premature split of a cluster or early termination could be caused by initial cluster center data points being chosen too close to each other; and since the selection process is random there is no control with this selection subroutine 60. This selection subroutine 60 does allow for clustering of outlier data points, but possibility of early termination is a disadvantage.

Figure 7:
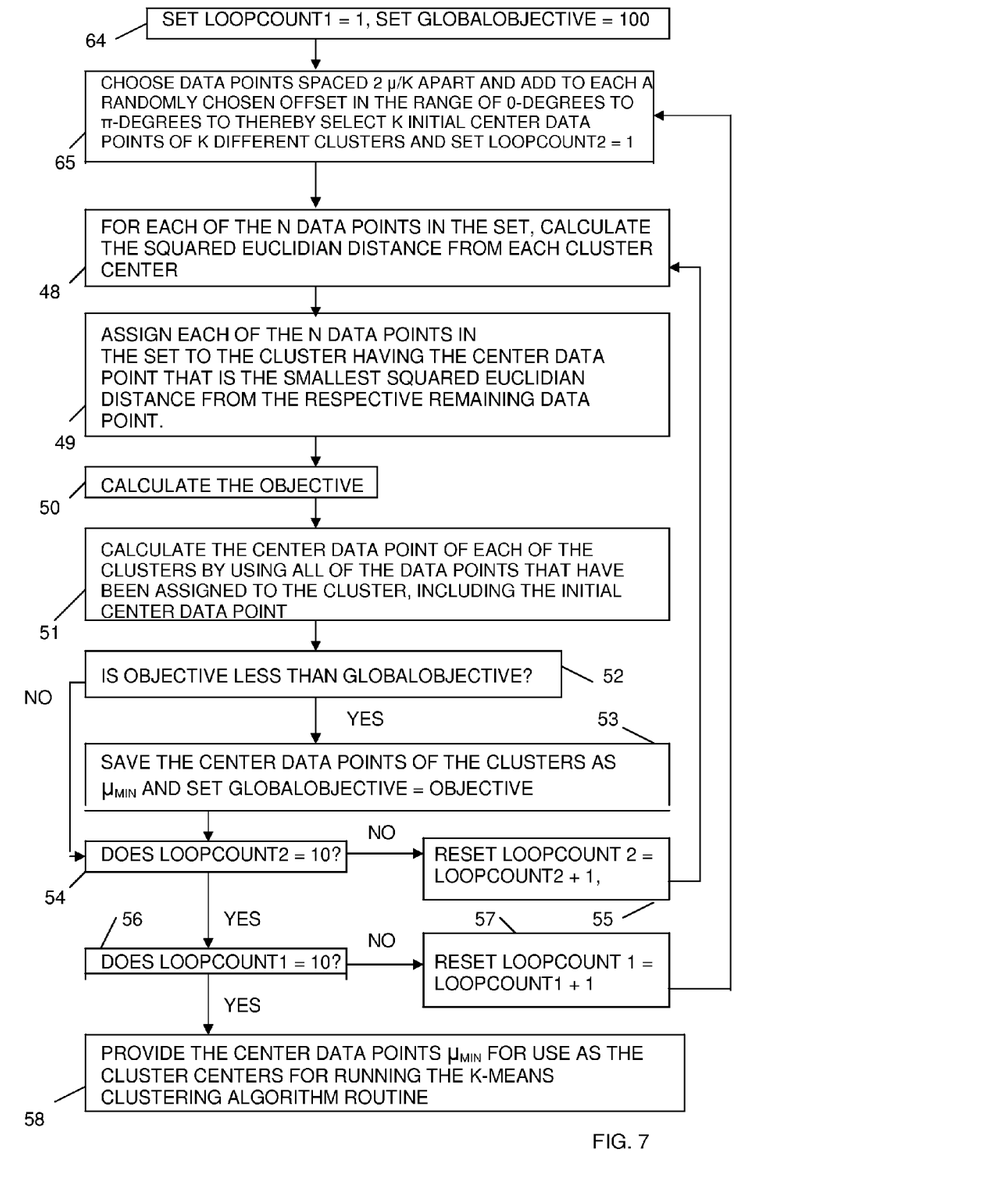
FIG. 7 is a flow diagram of another embodiment of the k-means clustering algorithm subroutine shown in FIG. 4.

Referring to FIG. 7, when the given parameter is the angle of arrival (AOA) of a received target signal, the clustering algorithm subroutine 38 described above with reference to FIG. 4 includes a subroutine 64 in which loopCount1 is set to equal 1 and GlobalObjective is set to equal a selected number. Next in subroutine 65, k AOA estimates (data points) that are spaced $2\pi/k$ apart are chosen and then individually added to a randomly chosen offset in the range of 0-degrees to $\pi$-degrees to thereby select k initial center data points $\mu_1, \ldots \mu_k$ of k different clusters and loopCount2 is set to equal 1.

The remaining subroutines in the embodiment of FIG. 7 are the same as subroutines 48 through 58 described above with reference to FIG. 5, except that when it is determined pursuant to subroutine 56 that loopCount1 does not equal 10, after loopCount1 has been reset to equal loopCount1+1 pursuant to subroutine 57, subroutines 65 and 48 through 56 are repeated until loopCount1 equals 10; and when it is determined pursuant to subroutine 56 that loopCount1 does equal 10, the subroutine 58 provides the center data points of the clusters saved during subroutine 53 as $\mu_{min}$ for use as the cluster centers for use when repeating subroutines 65 and 48 through 57.

The initial cluster center data point selection subroutine 65 works well for clustering data points that were most likely caused by antenna limitation ambiguities, since they usually occur far from the main cluster. However, subroutine 65 did not help with the problem of erroneous angle estimates that are caused by poor SNR or interferers, when data points affected by poor SNR or interferers are located closer to the main cluster.

Figure 8:
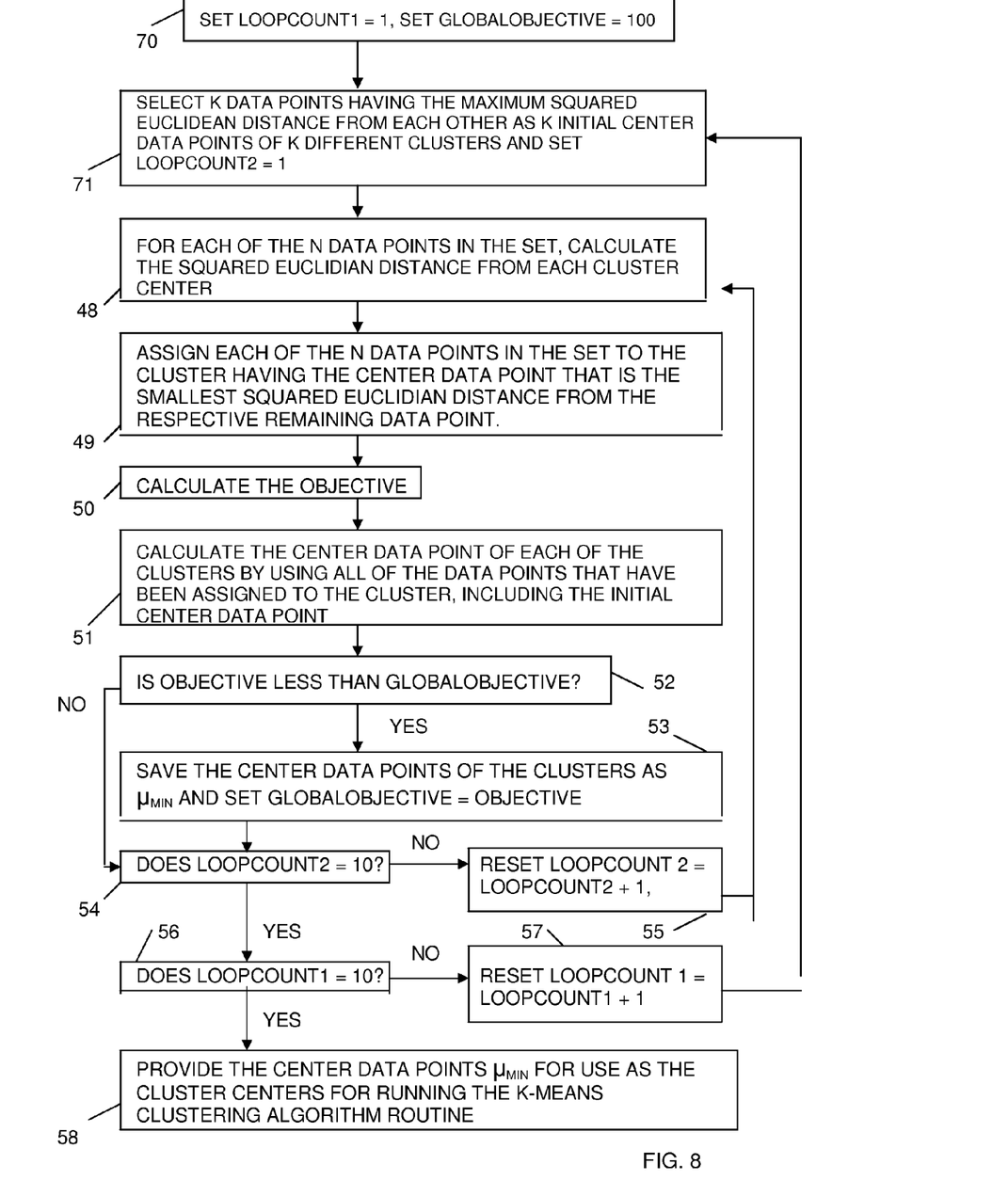
FIG. 8 is a flow diagram of yet another embodiment of the k-means clustering algorithm subroutine shown in FIG. 4.

Referring to FIG. 8, when the given parameter is the angle of arrival (AOA) of a received target signal, the clustering algorithm subroutine 38 described above with reference to FIG. 4 includes a subroutine 70 in which loopCount1 is set to equal 1 and GlobalObjective is set to equal a selected number. Next in subroutine 71, k data points having the maximum squared Euclidean distance from each other are selected as k initial center data points $\mu_1, \ldots \mu_k$ of k different clusters and loopCount2 is set to equal 1.

During subroutine 71, one data point from the set of N data points is randomly selected as a first cluster initial center data point and the maximum squared Euclidean distance from the first cluster center data point to each of the remaining data points of the set is calculated. The data point that is the maximum distance from the first cluster center data point is selected as the second cluster initial center data point.

Next during subroutine 71, the maximum squared Euclidean distance between the second cluster initial data point and the remaining unselected data points of the set is calculated; and the data point of the remaining unselected data points that is the maximum distance from the second cluster center data point is selected as the third cluster initial center data point. These calculations are repeated with respect to each newly selected cluster initial center data point until initial center data points have been selected for k clusters.

After the initial center data points $\mu_1, \ldots \mu_k$ have been selected for k clusters, the remaining subroutines in the embodiment of FIG. 8 are the same as subroutines 48 through 58 described above with reference to FIG. 5, except that when it is determined pursuant to subroutine 56 that loopCount1 does not equal 10, after loopCount1 has been reset to equal loopCount1+1 pursuant to subroutine 57, subroutines 71 and 48 through 56 are repeated until loopCount1 equals 10; and when it is determined pursuant to subroutine 56 that loop-Count1 does equal 10, the subroutine 58 provides the center data points of the clusters saved during subroutine 53 as $\mu_{min}$ for use as the cluster centers for use when repeating subroutines 71 and 48 through 57.

The initial cluster center data point selection subroutine 71 works well and presently is the preferred technique of initial cluster center data point selection. This selection subroutine 71 works particularly well for clustering data points that are outliers due to antenna limitation ambiguities and/or due to poor SNR and/or interferers. This selection subroutine 71 also works well for sorting AOAs from multiple targets.

Clustering enhances the capability of the direction finding system to determine preferred AOAs for multiple target signals received in the same frequency band from multiple targets.

In an embodiment in which the preferred cluster is the cluster with the largest number of data points that are less than a threshold dimension from the center of the cluster, the given parameter is the angle of arrival (AOA) of a target signal detected by an array of antenna elements, and the data points of the two clusters having the largest numbers of data points are less than the threshold dimension from the center of the particular cluster, the respective data points of both clusters are selected for making separate preferred estimates of angles of arrival of different target signals.

To identify multiple targets, the target identification algorithm must filter out any clusters caused by antenna limitation ambiguities. This algorithm uses the knowledge of the cluster's transmission frequencies, likelihood ratios, transmission time, and antenna patterns used for each data point in a cluster. The transmission frequency of the target signal and the pattern of antenna elements are used to determine if an antenna limitation ambiguity might exist for a given set of data points. If none exists, then the set must only contain targets.

If the transmission frequency of the target signal indicates that ambiguities might exist, the locations of the ambiguities can be estimated by using pre-computed tables based on estimated AOAs and frequency. The locations of ambiguities are a function of frequency, actual angle of arrival, and spacing of the antenna elements. Using these tables, a cluster can be identified as a potential ambiguity if its location relative to another cluster is found in the table. If the source of the potentially ambiguous cluster is active, the identification algorithm cause the antenna pattern can be changed temporarily to see if the potential ambiguity goes away. If it is not possible to change the antenna pattern, the potential ambiguity cluster is processed as representing a target with a reduced likelihood ratio. Likelihood ratios can be used to further filter out unwanted clusters by comparing the cluster's average likelihood ratio to a threshold.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The benefits specifically stated herein do not necessarily apply to every conceivable embodiment of the present invention. Further, such stated benefits of the present invention are only examples and should not be construed as the only benefits of the present invention. While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents.

The invention claimed is:

1. A method of making a preferred estimate of a given parameter by processing a set of data points representing estimates of the given parameter, comprising the steps of:
   (a) obtaining a set of data points representing estimates of a given parameter;
   (b) using a computer to process said data points with an unsupervised clustering algorithm to select data points for use in making a preferred estimate of the given parameter; and
   (c) using the selected data points to make a preferred estimate of the given parameter;
   wherein step (b) comprises the steps of
   (d) organizing the set of data points representing estimates of the given parameter into different clusters of said data points by assigning the respective data points to their closest cluster;
   (e) after all of the data points have been assigned, averaging all of the data points in each cluster to calculate a new data point at the center of each cluster;
   (f) when at least some of the most recently calculated data points do not converge into a preferred cluster having predetermined characteristics, repeating steps (d) and (e) with the most recently calculated data points until at least some of the most recently calculated data points converge into a preferred cluster having the predetermined characteristics; and
   (g) when at least some, but not all, of the most recently calculated data points converge into a preferred cluster having the predetermined characteristics selecting the data points of the preferred cluster for use in making the preferred estimate of the given parameter.

2. A method according to claim 1, wherein the preferred cluster is the cluster with the largest number of data points that are less than a threshold dimension from the center of the cluster.

3. A method according to claim 1, wherein step (c) comprises making the preferred estimate of the given parameter by determining a weighted average of the selected data points in the preferred cluster, with individual data point being weighted by a likelihood ratio of the probability of the estimate represented by the individual data point in relation to another possible estimate.

4. A method according to claim 3, wherein when the given parameter is the angle of arrival (AOA) of a target signal received by an array of antenna elements and the set of data points is derived from samples of the received signal, the likelihood ratio is either:
   (i) $E_{global}/(E_{total}-E_{global})$ when no local maximum exists after removing the effects of an antenna response that is dependent on the AOA of the received signal, wherein $E_{total}$ is the total energy of the samples of the target signal from which the set of data points is derived, and $E_{global}$ is the energy of the global maximum of the received signal after removing the effects of an antenna response that is dependent on the AOA; or
   (ii) $(E_{total}-E_{local})/(E_{total}-E_{global})$, wherein when a local maximum exists after removing the effects of an antenna response that is dependent on the AOA of the received signal, wherein $E_{local}$ is the energy of the local maximum signal after removing the effects of an antenna response that is dependent on the AOA.

5. A method according to claim 1, wherein the unsupervised clustering algorithm is a k-means algorithm.

6. A method according to claim 1, wherein the given parameter is the angle of arrival of a target signal detected by an array of antenna elements.

7. A method of making a preferred estimate of a given parameter by processing a set of data points representing estimates of the given parameter, comprising the steps of:
   (a) obtaining a set of data points representing estimates of a given parameter;
   (b) using a computer to process said data points with an unsupervised clustering algorithm to select data points for use in making a preferred estimate of the given parameter; and
   (c) using the selected data points to make a preferred estimate of the given parameter;
   wherein step (b) comprises the steps of
   (d) organizing the set of data points representing estimates of the given parameter into different clusters of said data points by assigning the respective data points to their closest cluster;
   (e) after all of the data points have been assigned, averaging all of the data points in each cluster to calculate a new data point at the center of each cluster;
   (f) when at least some of the most recently calculated data points do not converge into a preferred cluster having predetermined characteristics, repeating steps (d) and (e) with the most recently calculated data points until at least some of the most recently calculated data points converge into a preferred cluster having the predetermined characteristics; and
   (g) when at least some of the most recently calculated data points converge into a preferred cluster having the predetermined characteristics selecting the data points of the preferred cluster for use in making the preferred estimate of the given parameter;
   wherein the preferred cluster is the cluster with the largest number of data points that are less than a threshold dimension from the center of the cluster; and
   wherein when the given parameter is the angle of arrival (AOA) of, a target signal detected by an array of antenna elements, and the data points of the two clusters having the largest numbers of data points are less than the threshold dimension from the center of the particular cluster, the respective data points of both clusters are selected for making separate preferred estimates of angles of arrival of different target signals.

8. A system for making a preferred estimate of a given parameter by processing a set of data points representing estimates of the given parameter, comprising:
   a computer adapted for obtaining a set of data points representing estimates of a given parameter by processing samples of a signal having the given parameter, also adapted for processing said data points with an unsupervised clustering algorithm to select data points for use in making a preferred estimate of the given parameter and further adapted for using the selected data points to make a preferred estimate of the given parameter;
   wherein the computer is adapted for said processing of the data points by performing the routines of:
   (a) organizing the set of data points representing estimates of the given parameter into different clusters of said data points by assigning the respective data points to their closest cluster;
   (b) after all of the data points have been assigned, averaging all of the data points in each cluster to calculate a new data point at the center of each cluster;
   (c) when at least some of the most recently calculated data points do not converge into a preferred cluster having predetermined characteristics, repeating steps (a) and (b) with the most recently calculated data points until at least some of the most recently calculated data points converge into a preferred cluster having the predetermined characteristics; and
   (d) when at least some, but not all, of the most recently calculated data points converge into a preferred cluster having the predetermined characteristics selecting the data points of the preferred cluster for use in making the preferred estimate of the given parameter.

9. A system according to claim 8, wherein the preferred cluster is the cluster with the largest number of data points that are less than a threshold dimension from the center of the cluster.

10. A system, according to claim 8, wherein the means for using the selected data points is adapted for making the preferred estimate of the given parameter by determining a weighted average of the selected data points in the preferred cluster, with individual data point being weighted by a likelihood ratio of the probability of the estimate represented by the individual data point in relation to another possible estimate.

11. A system according to claim 10, wherein when the given parameter is the angle of arrival (AOA) of a target signal received by an array of antenna elements and the set of data points is derived from samples of the received signal, the likelihood ratio is either:
   $E_{global}/(E_{total}-E_{global})$ when no local maximum exists after removing the effects of an antenna response that is dependent on the AOA of the received signal, wherein $E_{total}$ is the total energy of the samples of the target signal from which the set of data points is derived, and $E_{global}$ is the energy of the global maximum of the received signal after removing the effects of an antenna response that is dependent on the AOA; or
   $(E_{total}-E_{local})/(E_{total}-E_{global})$, wherein when a local maximum exists after removing the effects of an antenna response that is dependent on the AOA of the received signal, wherein $E_{local}$ is the energy of the local maximum signal after removing the effects of an antenna response that is dependent on the AOA.

12. A system according to claim 8, wherein the unsupervised clustering algorithm is a k-means algorithm.

13. A system according to claim 8, wherein the given parameter is the angle of arrival of a target signal detected by an array of antenna elements.

14. A system for making a preferred estimate of a given parameter by processing a set of data points representing estimates of the given parameter, comprising:
   a computer adapted for obtaining a set of data points representing estimates of a given parameter by processing samples of a signal having, the given parameter, also a adapted for processing said data points with an unsupervised clustering algorithm to select data points for use in making a preferred estimate of the given parameter and further adapted for using the selected data points to make a preferred estimate of the given parameter;

wherein the computer is adapted for said processing of the data points by performing the routines of
(a) organizing the set of data points representing estimates of the given parameter into different clusters of said data points by assigning the respective data points to their closest cluster;
(b) after all of the data points have been assigned, averaging all of the data points in each cluster to calculate a new data point at the center of each cluster;
(c) when at least some of the most recently calculated data points do not converge into a preferred cluster having predetermined characteristics, repeating steps (a) and (b) with the most recently calculated data points until at least some of the most recently calculated data points converge into a preferred cluster having the predetermined characteristics; and
(d) when at least some of the most recently calculated data points converge into a preferred cluster having the predetermined characteristics selecting the data points of the preferred cluster for use in, making the preferred estimate of the given parameter; and
wherein when the given parameter is the angle of arrival of a target signal detected by an array of antenna elements, and the data points of the two clusters having the largest numbers of data points are less than the threshold dimension from the center of the particular cluster, the respective data points of both clusters are selected for making separate preferred estimates of angles of arrival of different target signals.

15. A nontransitory computer readable storage medium containing computer executable program instructions for use with a computer in a system for making a preferred estimate of a given parameter by processing a set of data points representing estimates of the given parameter, wherein the system comprises: means for obtaining a sot of data points representing estimates of a given parameter; a computer for processing said data points to select data points for use in making a preferred estimate of the given parameter; and means for using the selected data points to make the preferred estimate of the given parameter,
wherein the computer readable storage medium contains computer executable to program instructions for causing the computer to process said data points with an unsupervised clustering algorithm to select said data points for use in making the preferred estimate of the given parameter; and for causing the computer to select said data points for use in making the preferred estimate of the given parameter by performing the routines of:
(a) organizing the set of data points representing estimates of the given parameter into different clusters of said data points by assigning the respective data points to their closest cluster;
(b) after all of the data points have been assigned, averaging all of the data points in each cluster to calculate a new data point at the center of each cluster;
(c) when at least some of the most recently calculated data points do not converge into a preferred cluster having predetermined characteristics, repeating steps (a) and (b) with the most recently calculated data points until at least some of the most recently calculated data points converge into a preferred cluster having the predetermined characteristics; and
(d) when at least some, but not all, of the most recently calculated data points converge into a preferred cluster having the predetermined characteristics selecting the data points of the preferred cluster for use in making the preferred estimate of the given parameter.

16. A nontransitory computer readable storage medium according to claim 15, wherein the preferred cluster is the cluster with the largest number of data points that are less than a threshold dimension from the center, of the cluster.

17. A nontransitory computer readable storage medium according to claim 15, further containing computer executable program instructions for causing a computer to process the selected data points to make the preferred estimate of the given parameter by determining a weighted average of the selected data points in the preferred cluster, with individual data point being weighted by a likelihood ratio of the probability of the estimate represented by the individual data point in relation to another possible estimate.

18. A nontransitory, computer readable storage medium according to claim 17, wherein when the given parameter is the angle of arrival (AOA) of a target signal received by an array of antenna element's and the set of data points is derived from samples of the received signal, the likelihood ratio is either:
(i) $E_{global}/(E_{total}-E_{global})$ when no local maximum exists after removing the effects of an antenna response that is dependent on the AOA of the received signal, wherein $E_{total}$ is the total energy of the samples of the target signal from which the set of data points is derived, and $E_{global}$ is the energy of the global maximum of the received signal after removing the effects of an antenna response that is dependent on the AOA; or
(ii) $(E_{total}-E_{local})/(E_{total}-E_{global})$, wherein when a local maximum exists after removing the effects of an antenna response that is dependent on the AOA of the received signal, wherein $E_{local}$ is the energy of the local maximum signal after removing the effects of an antenna response that is dependent on the AOA.

19. A nontransitory computer readable storage medium according to claim 15, wherein the unsupervised clustering algorithm is a k-means algorithm.

20. A nontransitory computer readable storage medium according to claim 15, wherein the given parameter is the angle of arrival of a target signal detected by an array of antenna elements.

21. A nontransitory computer readable storage medium containing computer executable program instructions for use with a computer in a system for making a preferred estimate of a given parameter by processing a set of data points representing estimates of the given parameter, wherein the system comprises: means for obtaining a set of data points representing estimates of a given parameter; a computer for processing said data points to select data points for use in making a preferred estimate of the given parameter; and means for using the selected data points to make the preferred estimate of the given parameter,
wherein the computer readable storage medium contains computer executable program instructions for causing the computer, to process said data points with an unsupervised clustering algorithm to select said data points for use in making the preferred estimate of the given parameter; and for causing the computer to select said data points for use in making the preferred estimate of the given parameter by performing the routines of:
(a) organizing the set of data points representing estimates of the given parameter into different clusters of said data points by assigning the respective data points to their closest cluster;
(b) after all of the data points have been assigned, averaging all of the data points in each cluster to calculate a new data point at the center of each cluster;

(c) when at least some of the most recently calculated data points do not converge into a preferred cluster having predetermined characteristics, repeating steps (a) and (b) with the most recently calculated data points until at least some of the most recently calculated data points converge into a preferred cluster having the predetermined characteristics; and (d) when at least some of the most recently calculated data points converge into a preferred cluster having the predetermined characteristics selecting the data points of the preferred cluster for use in making the preferred estimate of the given parameter;

wherein the preferred cluster is the cluster with the largest number of data points that are less than a threshold dimension from the center of the cluster; and wherein when the given parameter is the angle of arrival of a target signal detected by an array of antenna elements, and the data points of the two clusters having the largest numbers of data points are less than the threshold dimension from the center of the particular cluster, the respective data points of both clusters are selected for making separate preferred estimates of angles of arrival of different target signals.

* * * * *

UNITED STATES PATENT AND TRADEMARK OFFICE
CERTIFICATE OF CORRECTION

| | | |
|---|---|---|
| PATENT NO. | : 8,175,851 B1 | |
| APPLICATION NO. | : 12/566480 | |
| DATED | : May 8, 2012 | |
| INVENTOR(S) | : James Covosso Francis et al. | |

It is certified that error appears in the above-identified patent and that said Letters Patent is hereby corrected as shown below:

at column 6, line 53, in Equation 1 "$d(\phi i,\mu)$" should be -- $d(\phi i,\mu)^2$ --
at column 12, line 38, -- (i) -- should be inserted at the beginning of the line
at column 12, line 46, -- (ii) -- should be inserted at the beginning of the line
at column 13, line 35, "sot" should be -- set --
at column 13, line 42, "to" should be omitted
at column 14, line 4, the "," after "center" should be omitted
at column 14, line 17, "element's" should be -- elements --
at column 14, line 55, the "," after "computer" should be omitted Signed and Sealed this
Sixteenth Day of October, 2012

David J. Kappos
*Director of the United States Patent and Trademark Office*